(12) United States Patent
Kanada et al.

(10) Patent No.: US 10,286,771 B2
(45) Date of Patent: May 14, 2019

(54) DRIVE UNIT FOR HYBRID VEHICLE

(71) Applicant: Toyota Jidosha Kabushiki Kaisha, Toyota-shi (JP)

(72) Inventors: Toshiki Kanada, Anjo (JP); Tatsuya Imamura, Okazaki (JP); Yasuki Yoshikawa, Okazaki (JP); Atsushi Tabata, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 203 days.

(21) Appl. No.: 15/286,321

(22) Filed: Oct. 5, 2016

(65) Prior Publication Data

US 2017/0096058 A1  Apr. 6, 2017

(30) Foreign Application Priority Data

Oct. 5, 2015 (JP) .................. 2015-197888

(51) Int. Cl.
| | |
|---|---|
| *B60K 6/40* | (2007.10) |
| *B60K 6/442* | (2007.10) |
| *B60K 6/365* | (2007.10) |
| *B60K 6/405* | (2007.10) |
| *B60K 6/547* | (2007.10) |

(Continued)

(52) U.S. Cl.
CPC .............. *B60K 6/442* (2013.01); *B60K 6/365* (2013.01); *B60K 6/387* (2013.01); *B60K 6/40* (2013.01); *B60K 6/405* (2013.01); *B60K 6/445* (2013.01); *B60K 6/547* (2013.01); *F16H 3/728* (2013.01); *F16H 37/042* (2013.01); *F16H 57/02* (2013.01); *B60Y 2200/92* (2013.01); *B60Y 2400/424* (2013.01); *B60Y 2400/73* (2013.01); *B60Y 2400/80* (2013.01); *B60Y 2410/10* (2013.01); *F16H 2057/02034* (2013.01); *Y02T 10/6239* (2013.01); *Y10S 903/91* (2013.01);

(Continued)

(58) Field of Classification Search
CPC .......... B60K 6/40; B60K 6/405; B60K 6/442; B60K 6/445; B60K 6/365; B60K 6/387; B60K 6/547; F16H 57/02; F16H 2057/02034; F16H 3/728; F16H 37/042; B60Y 2400/10; B60Y 2400/73; B60Y 2400/424; B60Y 2200/92
See application file for complete search history.

(56) References Cited

U.S. PATENT DOCUMENTS

| | | | |
|---|---|---|---|
| 9,140,343 B1* | 9/2015 | Kim ................. | B60K 6/365 |
| 2013/0035186 A1 | 2/2013 | Martin et al. | |

(Continued)

FOREIGN PATENT DOCUMENTS

| | | |
|---|---|---|
| JP | 2012-71699 A | 4/2012 |
| JP | 2013-129330 A | 7/2013 |

(Continued)

*Primary Examiner* — Jacob S. Scott
*Assistant Examiner* — Lori Wu
(74) *Attorney, Agent, or Firm* — Oblon, McClelland, Maier & Neustadt, L.L.P.

(57) ABSTRACT

A drive unit for a hybrid vehicle an axial length thereof is shortened is provided. A power distribution device is disposed in an inner circumferential side of a cylindrical output gear, and at least a portion of a second clutch is also disposed in the inner circumferential side of the output gear while being adjacent to the power distribution device in an axial direction.

7 Claims, 11 Drawing Sheets

(51) Int. Cl.
  *F16H 3/72* (2006.01)
  *F16H 37/04* (2006.01)
  *F16H 57/02* (2012.01)
  *B60K 6/387* (2007.10)
  *B60K 6/445* (2007.10)

(52) U.S. Cl.
  CPC ........ *Y10S 903/912* (2013.01); *Y10S 903/919* (2013.01); *Y10S 903/952* (2013.01)

(56) References Cited

U.S. PATENT DOCUMENTS

| | | |
|---|---|---|
| 2013/0040773 A1 | 2/2013 | Sugino |
| 2014/0378259 A1* | 12/2014 | Kim ...................... B60K 6/365 475/5 |
| 2015/0072819 A1 | 3/2015 | Ono et al. |
| 2015/0099605 A1* | 4/2015 | Choi ...................... B60K 6/365 477/5 |
| 2015/0151626 A1 | 6/2015 | Choi |
| 2016/0257189 A1* | 9/2016 | Hata ...................... B60K 6/365 |

FOREIGN PATENT DOCUMENTS

| | | |
|---|---|---|
| JP | 2015-107788 A | 8/2015 |
| WO | WO 2011/138892 A1 | 11/2011 |
| WO | WO 2013/114595 A1 | 8/2013 |

* cited by examiner

Fig. 6

|  |  |  |  | B0 | C0 | CS |
|---|---|---|---|---|---|---|
| EV Mode | Forward/Reverse | Single-Motor Mode | MG1 Connected |  |  |  |
|  |  |  | MG1 Disconnected |  | ◯ |  |
|  |  | Dual-Motor Mode |  | ◯ | ◯ |  |
| HV Mode | Series | Forward/Reverse |  |  |  | ◯ |
|  | Series Parallel | Forward | Variable |  | ◯ |  |
|  |  |  | Fixed (Dual-Motor) |  | ◯ | ◯ |
|  |  | Reverse |  |  | ◯ |  |

DRIVE UNIT FOR HYBRID VEHICLE

CROSS REFERENCE TO RELATED APPLICATIONS

The present application claims the benefit of priority to Japanese Patent Application No. 2015-197888 filed on Oct. 5, 2015 with the Japanese Patent Office, the entire contents of which are incorporated herein by reference in its entirety.

BACKGROUND

Field of the Disclosure

Embodiments of the present application relates to the art of a drive unit of a hybrid vehicle having an engine, two motors and a power distribution device, in which an operating mode is switched by manipulating clutches to change a power transmission route.

Discussion of the Related Art

PCT international publication WO 2013/114595 describes a hybrid vehicle driving apparatus. In the driving apparatus taught by WO 2013/114595, a power distribution device and a first motor are arranged coaxially with an engine. A countershaft extends parallel to a common rotational axis of the power distribution device and the first motor to deliver drive force from the power distribution device to a differential mechanism through the countershaft. A second motor is disposed parallel to the countershaft so that an output torque of the second motor is also delivered to the differential mechanism through the countershaft. According to the teachings of WO 2013/114595, the power distribution device is comprised of two sets of planetary gear mechanisms, and a travel mode of the driving apparatus is shifted by altering a connection between rotary elements of the planetary gear mechanisms PCT international publication WO 2011/138892 also describes a driving apparatus for a hybrid vehicle. In the driving apparatus taught by WO 2011/138892, an engine is connected to a first motor through a speed increasing mechanism, and to a second motor through a speed reducing mechanism. A first clutch is disposed between a ring gear of the speed increasing mechanism and an output gear, and a second clutch is disposed between the engine and the output gear. According to the teachings of WO 2011/138892, an operating mode of the driving apparatus may be shifted by manipulating the clutches among a series hybrid mode in which the second motor is driven by a power generated by the first motor, an engine directly-connected High mode, and engine directly-connected Low mode.

According to the teachings of WO 2013/114595, not only a hybrid mode (or a series parallel mode) in which an engine power is partially converted into an electric power to be supplied to the second motor to propel the vehicle, but also an electric vehicle mode in which the second motor or both of the first and the second motors are driven by an electric power supplied from a battery to propel the vehicle may be selected in the driving apparatus. However, a series mode in which the first motor is rotated by the engine and the second motor is driven by an electric power generate by the first motor to propel the vehicle is not available in the driving apparatus taught by WO 2013/114595. In the driving apparatus taught by WO 2011/138892, on the other hand, the speed increasing mechanism can be disconnected from the output gear that is connected to the second motor through the speed reducing mechanism, and hence the series mode is available. However, in the driving apparatus taught by WO 2011/138892, both of the speed increasing mechanism and the speed reducing mechanism are planetary gear units, and one of rotary elements of each of the planetary gear unit is fixed. That is, those planetary gear units are not allowed to distribute the engine power to the output gear and to any of the motors, and hence the series parallel mode is not available in the driving apparatus taught by WO 2011/138892.

In the hybrid vehicle, an operating mode is shifted by manipulating clutches to change a power transmission route. That is, the driving apparatus taught by WO 2013/114595 is allowed to establish the series mode and the driving apparatus taught by WO 2011/138892 is allowed to establish the series parallel mode by arranging an additional clutch in those driving apparatus. However, the driving apparatus enlarged by the additional clutch may not be fitted easily into the hybrid vehicle. Thus, it is difficult to increase available operating modes of the driving apparatus without enlarging the structure of the driving apparatus.

SUMMARY

Aspects of the present disclosure have been conceived noting the foregoing technical problems, and it is therefore an object of the present application is to provide a drive unit for a hybrid vehicle configured to increase operating modes while decreasing an axial length.

The present disclosure is applied to a drive unit for a hybrid vehicle, comprising an engine; a first motor having a generating function; a power distribution device that performs a differential action among an input element to which a torque of the engine is applied, a reaction element to which a torque of the first motor is applied, and an output element; an output gear to which a torque is delivered from the output element; a first clutch that connects an output shaft of the engine to a rotor of the first motor; a second clutch that allows a torque transmission from the engine to the output gear through the power distribution device; and a second motor that is activated by an electric power generated by the first motor to generate a drive torque to propel the vehicle. In order to achieve the above-explained objective, in the drive unit according to a non-limiting embodiment: the power distribution device, the output gear, the first motor, the first clutch, and the second clutch are arranged coaxially; the output gear is shaped into a cylinder having an inner diameter larger than an outer diameter of the power distribution device; the power distribution device is disposed in an inner circumferential side of the output gear; and at least a portion of the second clutch is disposed in an inner circumferential side of the output gear while being adjacent to the power distribution device in an axial direction.

In a non-limiting embodiment, the second clutch may be adapted to selectively deliver output torque of the engine to the input element, and the output element may be connected to the output gear.

In a non-limiting embodiment, the second clutch may be adapted to selectively connect the output element to the output gear, and the input element may be connected to the engine.

In a non-limiting embodiment, the first clutch may be disposed on the opposite side of the second clutch across the power distribution device in the axial direction and in an inner circumferential side of the output gear.

In a non-limiting embodiment, the second clutch may include friction facings that are engaged to frictionally transmit torque therebetween, and an actuation member that actuate the friction facings to engage the friction facings. In addition, the actuation member may form at least a portion of the second clutch.

In a non-limiting embodiment, the drive unit further comprises: a housing holding the power distribution device and the output gear; and an input shaft to which an output torque of the engine is applied, and which is inserted into the power distribution device along a rotational center axis. In addition, the housing may include a first bulkhead that rotatably supports the input shaft inserted thereto through a first bearing, the second clutch may be disposed between the power distribution device and the first bulkhead, the actuation member may include a piston that is actuated hydraulically, and the first bulkhead may include an oil passage for delivering oil to the actuation member.

In a non-limiting embodiment, the first bulkhead may include a cylindrical boss protruding in parallel to the input shaft toward the power distribution device, and the first bearing may be interposed between the input shaft and the boss. In addition, the actuation member may be fitted onto the boss.

In a non-limiting embodiment, the housing may include a second bulkhead that is disposed on an opposite side of the first bulkhead across the power distribution device in the axial direction. In addition, a first end of the output gear may be supported rotatably by a second bearing interposed between the first end and the first bulkhead, and a second end of the output gear may be supported rotatably by a third bearing interposed between the second end and the second bulkhead.

Thus, according to the non-limiting embodiment of the present application, the drive unit is provided with the first clutch that connects the engine to the first motor, and the second clutch that selectively torque transmission from the engine to the output gear through the power distribution device. According to a non-limiting embodiment, therefore, the hybrid mode may be selected from the series mode and the parallel mode. In addition, since an output torque of the engine is applied to the output gear while being amplified, a width of the output gear is widened. The output gear, which is widened, is situated in an outer circumferential side of the power distribution device, and the second clutch is held at least partially in a clearance created in an inner circumferential side of the output gear while being adjacent to the power distribution device. In a non-limiting embodiment, therefore, the number of components arranged in the axial direction of the output gear can be reduced to shorten an axial length of the drive unit. For this reason, the drive unit can be fitted easily into vehicles.

As described, the second clutch may be arranged in such a manner as to selectively deliver the output torque of the engine to the input element of the power distribution device. In this case, the second clutch will not be subjected to a significant torque and hence a smaller clutch may be used as the second clutch. For this reason, the drive unit may be further downsized.

Since the second clutch is disposed between the output element of the power distribution device and the output gear, the power distribution device may be disconnected from the output gear to be prevented from being rotated in case of propelling the vehicle by the second motor. In case of driving the second motor to propel the vehicle by the electric power generated by the first motor connected to engine by the first clutch, the power distribution device disconnected from the output gear is rotated integrally. In this case, a frictional loss resulting from a relative rotation between the rotary elements of the power distribution device can be reduced.

Since the first and the second clutches are arranged coaxially across the power distribution device in the inner circumferential side of the output gear, the number of components arranged in the axial direction of the output gear can be reduced to further shorten the axial length of the drive unit.

Specifically, the second clutch may be disposed between the bulkhead supporting the input shaft and the power distribution device, and the oil passage for delivering oil to the actuation member of the second clutch may be formed in the bulkhead. For this reason, an opening end of the oil passage may be situated close to the actuation member, and the oil may be delivered and discharged to/from the actuation member without passing through the input shaft. Thus, a structure of a hydraulic system can be simplified.

The hydraulic system may be further simplified by supporting the actuation member by the boss formed in the bulkhead.

In addition, the output gear may be supported by the bulkheads as a part of the housing through the bearings. For this reason, the output gear may be supported and positioned independently from the power distribution device and the second clutch, and hence the output gear 12 may be assembled easily.

BRIEF DESCRIPTION OF THE DRAWINGS

Features, aspects, and advantages of exemplary embodiments of the present disclosure will become better understood with reference to the following description and accompanying drawings, which should not limit the invention in any way.

FIG. 6 is a table showing engagement states of the clutches and the brake in each operating mode;

DETAILED DESCRIPTION OF THE PREFERRED EMBODIMENTS

Figure 1:
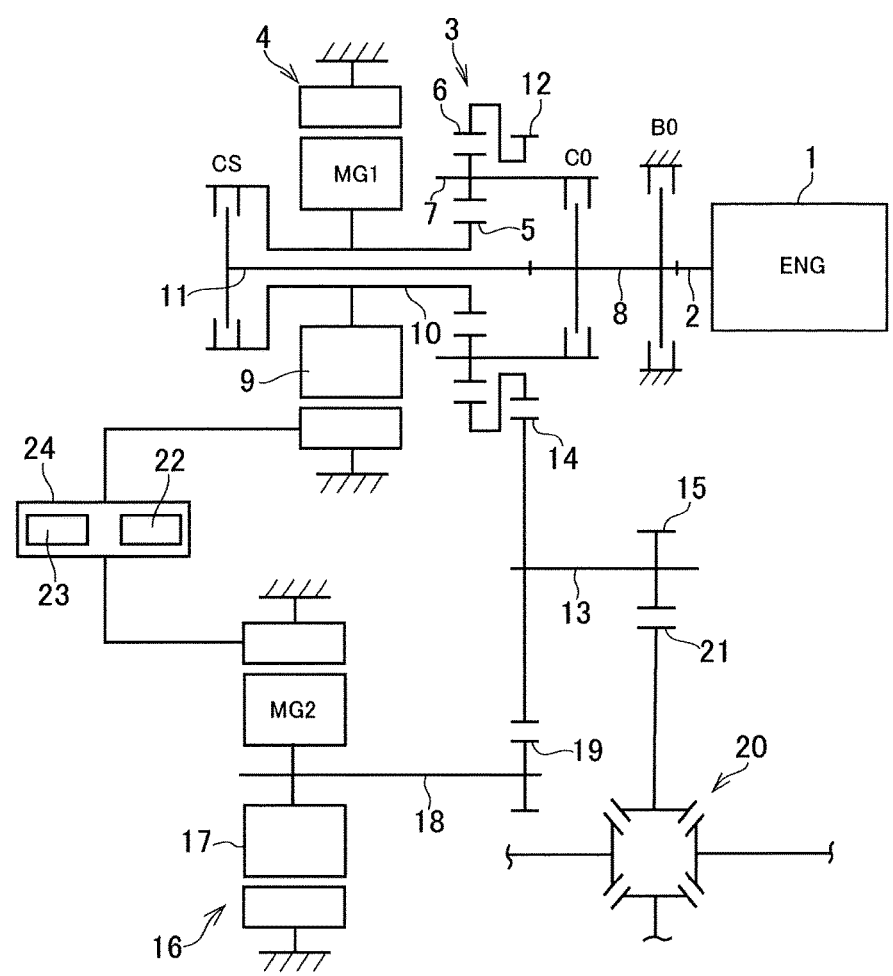
FIG. 1 is a schematic diagram showing one embodiment of the drive unit according to the present application.

Preferred embodiments of the present application will now be explained with reference to the accompanying drawings. Referring now to FIG. 1, there is shown the first preferred embodiment of the drive unit according to the present application. The drive unit shown in FIG. 1 is provided with two motors and an internal combustion engine (as will be simply called the "engine" hereinafter) to power the vehicle, and in the drive unit, a plurality of transmission shafts are arranged parallel to each other. For example, a permanent magnet synchronous motor having a generating function may be used as the motor, and a gasoline engine or a diesel engine may be used as the engine. Here, it is to be noted that FIG. 1 merely shows connections between components, and actual positions and locations of the components should not be limited to those shown in FIG. 1.

In the drive unit shown in FIG. 1, a power distribution device 3 and a first motor (abbreviated as "MG1" in FIG. 1) 4 are arranged coaxially with an output shaft (i.e., a crankshaft) 2 of an engine (abbreviated as "ENG" in FIG. 1) 1. Specifically, the power distribution device 3 is a single-pinion planetary gear unit adapted to perform a differential action comprising a sun gear 5 as a reaction element, a ring gear 6 as an output element arranged concentrically with the sun gear 5, and a carrier 7 as an input element supporting planetary gears in a rotatable manner.

An input shaft 8 extending along a rotational center axis of the power distribution device 3 is connected to the input shaft 8, and an input clutch C0 as a second clutch is arranged to selectively connects the carrier 7 to the input shaft 8. A rotation of the output shaft 2 connected to the input shaft 8 is selectively halted by a brake B0.

Thus, the first motor 4 is disposed on an opposite side of the engine 1 across the power distribution device 3, and a rotor shaft 10 as a hollow shaft integral with a rotor 9 of the first motor 4 is connected to the sun gear 5. An intermediate shaft 11 penetrating through the rotor shaft 10 while being allowed to rotate relatively with respect to the rotor shaft 10 is connected to the input shaft 8 to be rotated integrally therewith. The intermediate shaft 11 is selectively connected to the rotor shaft 10 by a series clutch CS as a first clutch.

The ring gear 6 of the power distribution device 3 is connected to an output gear 12 to be rotated integrally therewith, and hence an output torque of the engine 1 is delivered to the output gear 12 through the power distribution device 3 by engaging the input clutch C0 while establishing a reaction torque by the first motor 4. Thus, such torque transmission from the engine 1 to the output gear 12 through the power distribution device 3 is selectively achieved by manipulating the input clutch C0.

A countershaft 13 extends parallel to the output shaft 2 of the engine 1, the input shaft 8 and the intermediate shaft 11. A driven gear 14 is fitted onto one end of the countershaft 13 to be meshed with the output gear 12, and a drive gear 15 is fitted onto the other end of the counter shaft 15.

A second motor (abbreviated as "MG2" in FIG. 1) 16 also having a generating function is disposed parallel to the countershaft 13. A drive gear 19 is fitted onto a rotor shaft 18 integral with a rotor 17 of the second motor 16 to be meshed with the driven gear 14. The second motor 16 is also a permanent magnet synchronous motor having a generating function, and an output torque of the second motor 16 is added to a torque delivered from the output gear 12.

A differential gear unit 20 as a final reduction is disposed parallel to the countershaft 13 and the second motor 16, and a ring gear 21 of the differential gear unit 20 is meshed with the drive gear 15 disposed on the countershaft 13.

The first motor 4 and the second motor 16 are electrically connected with a power source 24 including a storage device 22 such as a battery and a capacitor, and an inverter 23. The first motor 4 and the second motor 16 are selectively operated as a motor and a generator by controlling a current supply from the power source 24, and the second motor 16 can be operated as a motor by an electric power generated by the first motor 4.

Figure 2:
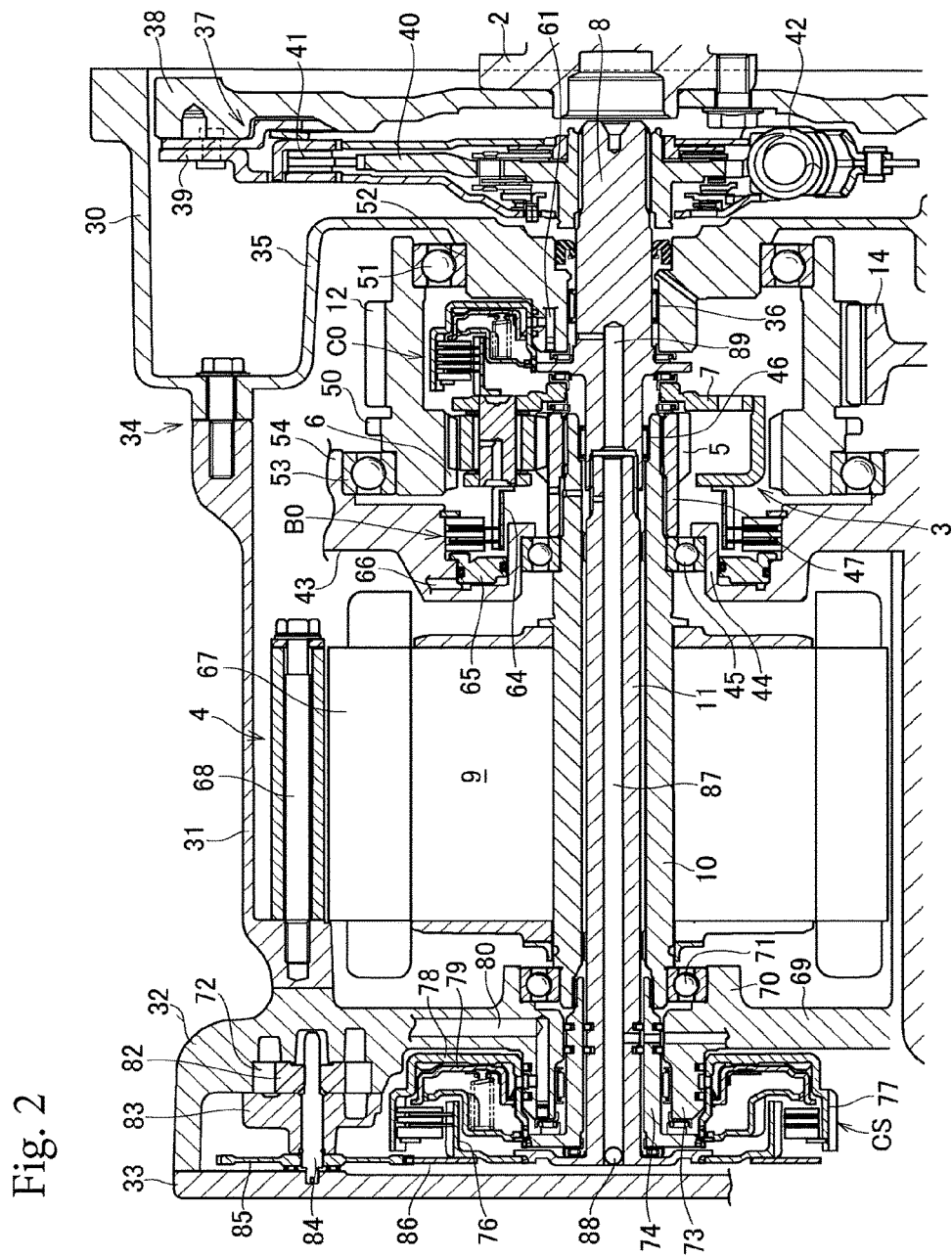
FIG. 2 is a cross-sectional view showing a cross-section of main part of the drive unit shown in FIG. 1.

Turning to FIG. 2, there is shown a cross-section of a main part of the drive unit shown in FIG. 1 around the input shaft 8. As illustrated in FIG. 2, the drive unit is covered by a housing 34 including a front housing 30 of the engine 1 side, a mid-housing 31 one end of which is connected to the front housing 30, a rear housing 32 connected to the other end of the mid-housing 31, and a rear cover 33 closing an opening of the rear housing 32. Specifically, the front housing 30 opens toward the engine 1, and an opening end thereof is connected to the ending 1. A circumferential edge of a first bulkhead 35 depressed toward the engine 1 is integrated with the other end of the front housing 30 connected to the mid-housing 31, and a through hole is formed on the first bulkhead 35. The input shaft 8 is inserted into the through hole of the first bulkhead 35 while being supported in a rotatable manner by a first bearing 36.

In the front housing 30, a torque limiter 37 is fitted onto a leading end of the input shaft 8. The torque limiter 37 comprises a drive plate 39 connected to a flywheel 38 integral with the output shaft 2, a driven plate 40 splined onto the input shaft 8, and a friction member 41 that frictionally connects the driven plate 40 to the drive plate 39. Specifically, when the torque transmitted between the drive plate 39 and the driven plate 40 through the friction member 41 exceeds the friction acting between the friction member 41 and the drive plate 39, the drive plate 39 starts slipping to limit torque transmission between the drive plate 39 and the driven plate 40. In addition, a spring damper 42 is arranged between the drive plate 39 and the driven plate 40.

Figure 3:
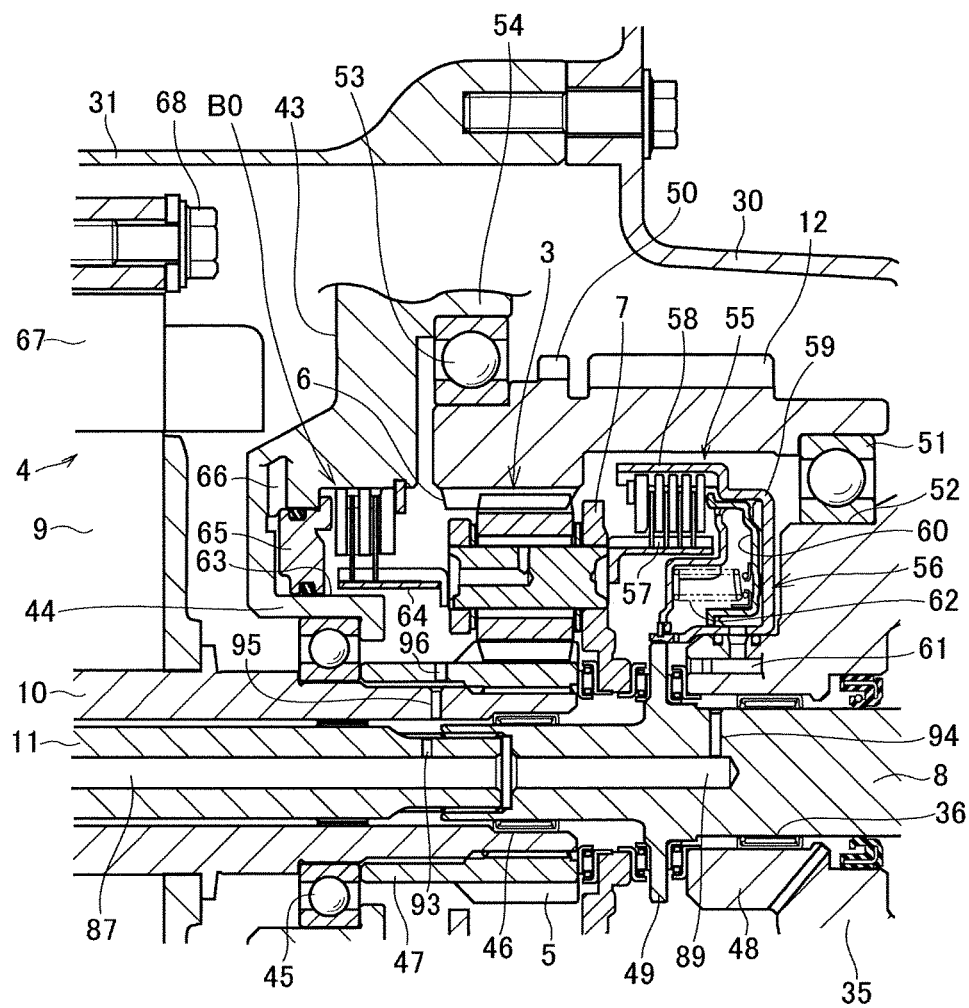
FIG. 3 is a partial cross-sectional view showing a cross-section of the power distribution device shown in FIG. 2 and in the vicinity thereof.

A second bulkhead 43 is formed on the mid-housing 31 to be opposed to the first bulkhead 35, and the power distribution device 3, the output gear 12, the input clutch C0, and the brake B0 are held in a chamber formed by the first bulkhead 35 and the second bulkhead 43. A cross-section of the chamber is shown in FIG. 3 in an enlarged scale. As depicted in FIG. 3, a through hole is also formed on the second bulkhead 43, and one end of the rotor shaft 10 is inserted into the through hole. A boss 44 is formed on a center of the second bulkhead 43, and a bearing 45 is interposed between an inner circumferential face of the boss 44 and an outer circumferential face of the rotor shaft 10 to support the rotor shaft 10 in a rotatable manner.

Said one end of the rotor shaft 10 is fitted onto a leading end of the input shaft 8, and a bearing 46 is interposed between an inner circumferential face of the rotor shaft 10 and an outer circumferential face of the input shaft 8. Thus, the leading end of the input shaft 8 is supported by the second bulkhead 43 of the mid-housing 31 through the bearing 46 and the rotor shaft 10.

The sun gear 5 as a reaction element of the power distribution device 3 is formed around a hollow sun gear shaft 47 that is splined onto said one end of the rotor shaft 10 in such a manner that one end thereof is brought into abutment with an inner race of the bearing 45. A circumference of the through hole of the first bulkhead 35 integrated with the front housing 30 is protruded toward the second bulkhead 43 to form a boss 48, and a flange 49 is formed on the input shaft 8 to be expanded radially outwardly while being opposed to a leading end face of the boss 48. An inner circumferential edge of an annular plate as a part of the carrier 7 is inserted into a clearance between the flange 49 and an other end of the sun gear shaft 47. A thrust bearing is individually disposed in a clearance between the boss 48 and the flange 49, in a clearance between the flange 49 and the annular plate of the carrier 7, and in a clearance between the annular plate of the carrier 7 and the other end of the sun gear shaft 47. Thus, axial positions of the bearing 46, the sun gear shaft 47, the carrier 7 and the input shaft 8 are fixed by the first bulkhead 35 and the second bulkhead 43.

According to the example shown in FIGS. 2 and 3, the ring gear 6 is integral with the output gear 12. Specifically, the output gear 12 is a cylindrical member an inner diameter of which is larger than an outer diameter of the power distribution device 3, and teeth are formed on an axially intermediate region of an outer circumferential face of the output gear 12. The ring gear 6 is formed on an inner circumferential face of one end of the output gear 12 (i.e., the left end in FIGS. 2 and 3). A parking gear 50 that is selectively engaged with a not shown parking lock pawl is formed adjacent to the teeth of the output gear 12 to halt a rotation of the output gear 12 when a shift position is shifted to parking position to park the vehicle.

A second bearing 51 is interposed between the inner circumferential face of the other end of the output gear 12 and an outer circumferential face of a diametrically-larger boss 52 of the first bulkhead 35. Thus, the other end of the output gear 12 is supported in a rotatable manner by the first bulkhead 35 integrated with the front housing 30 through the second bearing 51. In addition, a third bearing 53 is interposed between an outer circumferential face of said one end of the output gear 12 and an inner circumferential face of a large cylinder 54 of the mid-housing 31. That is, said one end of the output gear 12 is supported by the second bulkhead 43 of the mid-housing 31 through the third bearing 53. Thus, each end of the output gear 12 is individually supported by the first bulkhead 35 and the second bulkhead 43 through the second bearing 51 and the third bearing 53.

As described, the ring gear 6 is formed on the inner circumferential face of said one end of the cylindrical output gear 12, and the input clutch C0 is disposed in a clearance between the first bulkhead 35 and the power distribution device 3. The input clutch C0 as a friction clutch comprises friction facings 55 a torque transmitting capacity therebetween can be changed continuously, and an actuation member 56 that actuate the friction facings 55 to engage the friction facings 55 to frictionally transmit torque therebetween. Specifically, the friction facings 55 comprise friction discs splined onto a clutch hub 57 attached to the carrier 7 and friction plates splined to an inner circumferential face of a clutch drum 58, and the friction discs and the friction plates are arranged alternately.

One end of the clutch drum 58 (i.e., the right end in FIGS. 2 and 3) extends along the first bulkhead 35 to form a cylinder 59 as an annular depression. Specifically, the cylinder 59 opens toward the friction facings 55, and a piston 60 is held in the cylinder 59 to push the friction facings 55. Thus, the actuation member 56 comprises the cylinder 59 and the piston 60, and the friction discs and the friction plates of the friction facings 55 are pushed by the piston 60 to be brought into engagement to each other.

The cylinder 59 is fitted onto the boss 48 of the first bulkhead 35 in such a manner as to rotate relatively to each other. In order to deliver oil to the actuation member 56 to actuate the piston 60, an oil passage 61 is formed in the boss 48 to the vicinity of the leading end on which the cylinder 59 is fitted, and an opening of the oil passage 61 is connected to a through hole of the cylinder 59. Thus, the oil passage 61 for manipulating the input clutch C0 is formed in the member supporting the input clutch C0 to simplify an oil supply system. In addition, the input clutch C0 is constantly pushed by a return spring 62 in a direction to be disengaged.

Thus, in the embodiment shown in FIGS. 2 and 3, the input clutch C0 for selectively delivering the torque of the engine 1 to the carrier 7 is disposed in an inner circumferential side of the output gear 12 while being adjacent to the power distribution device 3. That is, the input clutch C0 is arranged utilizing the inner circumferential space of the output gear 12 having a long length. According to the embodiment shown in FIGS. 2 and 3, therefore, the number of components arranged in the axial direction of the output gear 12 can be reduced to shorten an axial length of the drive unit. For this reason, the drive unit can be fitted easily into vehicles. In addition, the output gear 12 is supported by the housing 34 through the bearings 51 and 53, and the input clutch C0 and the main part of the power distribution device 3 are supported by the input shaft 8 and the rotor shaft 10. According to the embodiment shown in FIGS. 2 and 3, therefore, an assemble work of the output gear 12 and an assemble work of the input clutch C0 or the power distribution device 3 can be carried out separately and easily.

The brake B0 is disposed on the opposite side of the input clutch C0 across the power distribution device 3 in the axial direction. The brake B0 that is also a friction clutch is adapted to selectively halt a rotation of the input shaft 8 or the output shaft 2 of the engine 1 through the carrier 7 by engaging friction discs with friction plates thereof. Specifically, a cylinder 63 as an annular depression is formed on a face of the second bulkhead 43 of the mid-housing 31 facing to the power distribution device 3, and a brake hub 64 is attached to the carrier 7 in such a manner as to extend into the cylinder 63. In the brake B0, the friction discs are splined onto the brake hub 64, and the friction plates are splined to an inner circumferential face of the cylinder 63. In order to engage the friction discs with the friction plates, a piston 65 is held in the cylinder 63 while being allowed to hydraulically reciprocate in the axial direction. To this end, an oil passage 66 is formed in the second bulkhead 43 to apply an oil pressure to the piston 65. Thus, the oil passage 66 for manipulating the brake B0 is also formed in the member supporting the brake B0 to simplify an oil supply system.

Figure 4:
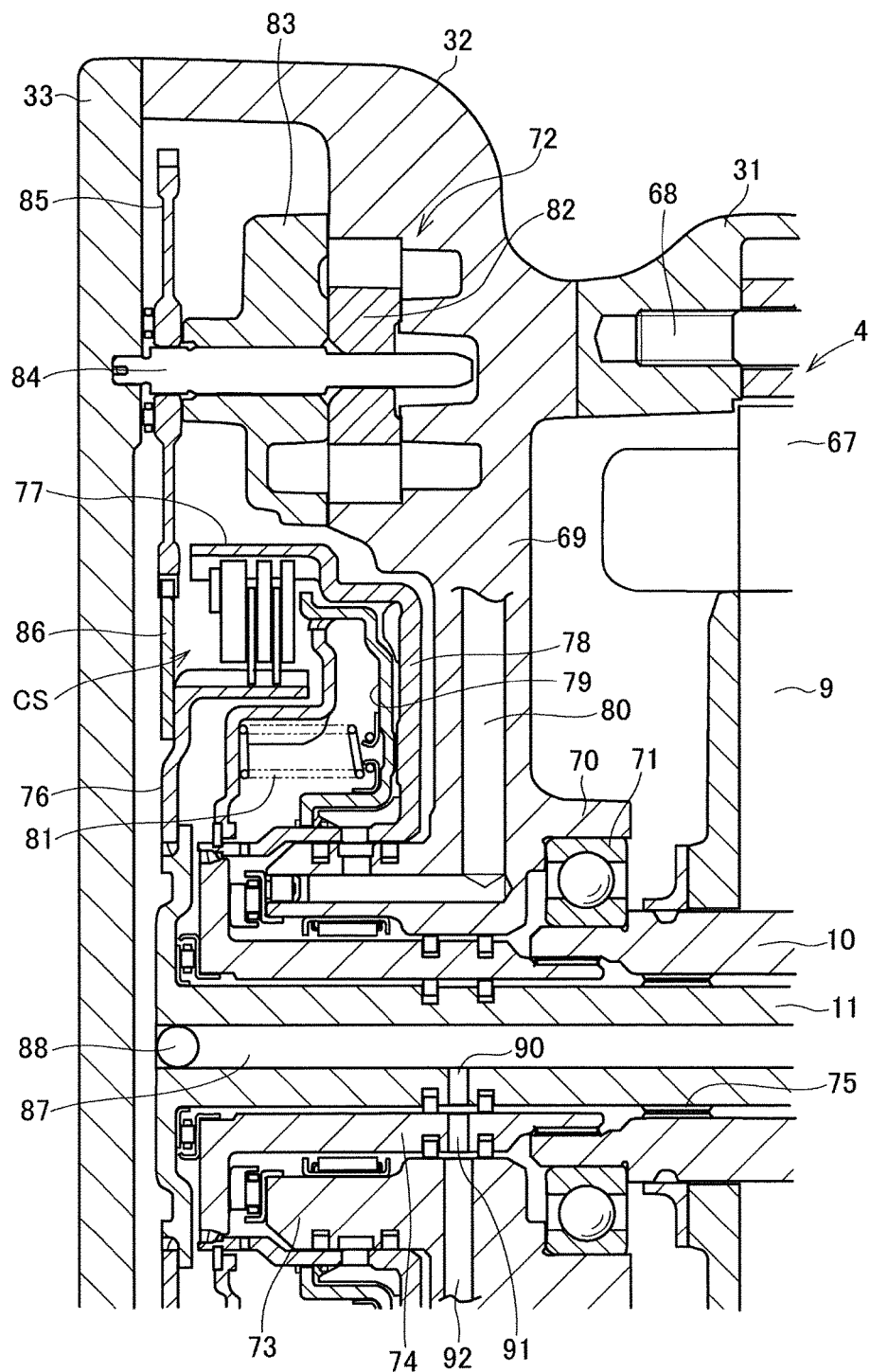
FIG. 4 is a partial cross-sectional view showing a cross-section of the series clutch of the power distribution device shown in FIG. 2 and in the vicinity thereof.

In the mid-housing 31, the first motor 4 is disposed on an opposite side of the brake B0 across the second bulkhead 43. A stator 67 of the first motor 4 is disposed along an inner circumferential face of the mid-housing 31, and fixed to the mid-housing 31 by a bolt 68. As described, one end of the rotor shaft 10 is supported by the second bulkhead 43 of the mid-housing 31, and as shown in FIG. 4, the other end (i.e., the left end in FIGS. 2 and 4) of the rotor shaft 10 is supported by the rear housing 32. Specifically, a third bulkhead 69 is formed on the rear housing 32 to be opposed to an end face of the first motor 4, and a cylindrical boss 70 is formed on a center of the third bulkhead 69 in such a manner as to protrude toward the first motor 4. The other end of the rotor shaft 10 is inserted into the boss 70, and a bearing 71 is interposed between an outer circumferential face of the rotor shaft 10 and an inner circumferential face of the boss 70. Thus, the other end of the rotor shaft 10 is supported in a rotatable manner by the third bulkhead 69 through the bearing 71.

A rear opening of the rear housing 32 is closed by the rear cover 33, and the series clutch CS and an oil pump 72 are held in the rear housing 32. In the example shown in FIG. 2, the series clutch CS is adapted to selectively connect the intermediate shaft 11 to the rotor shaft 10. Specifically, another boss 73 is also formed in the rear housing 32 to protrude toward the rear cover 33, and a hollow connection shaft 74 is inserted into the boss 73 in a rotatable manner. A leading end (i.e., the right end in FIGS. 2 and 4) of the connection shaft 74 is splined to the rotor shaft 10 to be rotated integrally therewith, and the intermediate shaft 11 is inserted into the connection shaft 74 and the rotor shaft 10. A bearing 75 is interposed between the intermediate shaft 11 and the rotor shaft 10, and a leading end (i.e., the right end in FIG. 2) of the intermediate shaft 8 is splined to the inner circumferential face of the cylindrical leading end of the input shaft 8. Thus, the intermediate shaft 11 is allowed to rotate integrally with the input shaft 8.

An other end (i.e., the left end in FIGS. 2 and 4) of the intermediate shaft 11 protrudes from the connection shaft 74 toward the rear cover 33 to be connected to a clutch hub 76, and an other end of the connection shaft 74 is connected to a cylinder 78 as an annular depression formed on a face of a clutch drum 77 facing to the third bulkhead 69. Specifically, both of the clutch hub 76 and the clutch drum 77 are cylindrical members arranged concentrically with each other, and the cylinder 78 is fitted onto the boss 73 of the third bulkhead 69 in a rotatable manner. The series clutch CS comprise friction discs splined onto a clutch hub 76 and friction plates splined to an inner circumferential face of the clutch drum 77, and the friction discs and the friction plates are arranged alternately. In order to engage the friction discs with the friction plates, a piston 79 is held in the cylinder 78 while being allowed to hydraulically reciprocate in the axial direction. To this end, an oil passage 80 is formed in the third bulkhead 69 to apply an oil pressure to the piston 79, and an opening of the oil passage 80 is connected to a through hole of the cylinder 78. Thus, the piston 79 of the series clutch CS is actuated by the oil delivered through the oil passage 80 formed in the third bulkhead 69, and constantly pushed back by a return spring 81.

The oil pump 72 is a gear pump having a rotary member 82 that is held in a depression formed on the rear housing 32 in an outer circumferential side of the series clutch CS, and the depression of the rear housing 32 is closed by a pump cover 83. A pump shaft 84 penetrates through the pump cover 83 and the rotary member 82 in parallel to a rotational axis of the series clutch CS, and one end of the pump shaft 84 protrudes from the pump cover 83 is supported by the rear cover 33 in a rotatable manner. A driven gear 85 is fitted onto said one end of the pump shaft 84 while being meshed with a drive gear 86 attached to the clutch hub 76. Thus, the oil pump 72 is driven by operating the engine 1 to generate hydraulic pressure.

Here will be explained a lubrication system of the drive unit according to the preferred embodiment. An oil passage 87 penetrates through the intermediate shaft 11 along a rotational center. One end of the oil passage 87 opening toward the rear cover 33 is closed by a plug 88, and the other end of the oil passage 87 is connected to an oil passage 89 extending axially in the leading end portion of the input shaft 8. In the rear housing 32, a lubrication passage 92 is formed in such a manner as to radially penetrate through the third bulkhead 69, and the oil passage 87 is connected to the lubrication passage 92 through a hole 90 formed in the intermediate shaft 11 and a hole 91 formed in the connection shaft 74. In order to prevent oil leakage from the holes 90 and 91, seal rings may be fitted onto the intermediate shaft 11 and the connection shaft 74.

As shown in FIG. 3, a hole 93 is formed on the intermediate shaft 11, and a hole 95 is formed on the rotor shaft 10 so that the outer circumferential face of the rotor shaft 10 can be lubricated by the oil delivered from the oil passage 87 of the intermediate shaft 11. In addition, a hole 96 is formed on the sun gear shaft 47 so that the oil can be further delivered toward the power distribution device 3. On the other hand, a hole 94 is formed on the input shaft 8 so that the oil delivered from the oil passage 89 of the intermediate shaft 8 can be further delivered to a clearance between the intermediate shaft 8 and the boss 48.

Thus, in the embodiment shown in FIGS. 2 to 4, the oil for actuating the input clutch C0, the series clutch CS and the brake B0 are delivered through the housing 34, and the oil for lubricating oil requiring sites is delivered through the shafts arranged along the rotational center. According to the preferred embodiment, therefore, a structure or configuration of the hydraulic system can be simplified.

Figure 5:
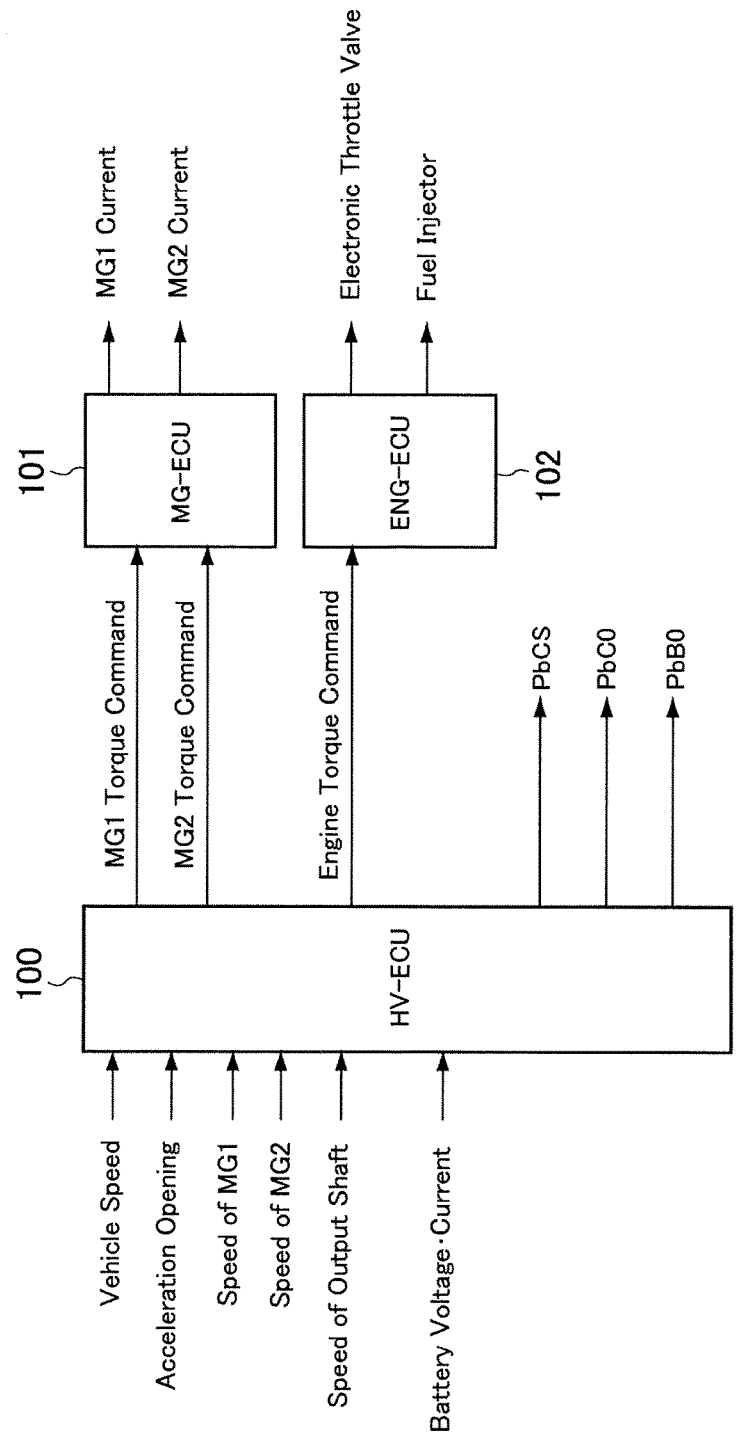
FIG. 5 is a block diagram schematically showing a control system.

An operating mode of the drive unit according to the preferred embodiment can be selected from an electric vehicle mode (abbreviated as the "EV mode" hereinafter) and a hybrid mode (abbreviated as the "HV mode" hereinafter), and the HV mode can be selected from a series mode and a series parallel mode. In order to electrically control the drive unit, the drive unit is provided with a hybrid control unit (as will be called the "HV-ECU" hereinafter) 100 as an electronic control unit. Turning to FIG. 5, there is shown a control system of the drive unit according to the preferred embodiment. The HV-ECU 100 is composed mainly of a microcomputer configured to carry out a calculation based on incident data, stored data and stored programs, and transmit a calculation result in the form of command signal. To this end, a vehicle speed, an opening degree of an accelerator (or a required driving force), a speed of the first motor 4, a speed of the second motor 16, a speed of an output shaft (i.e., a speed of the output gear 12 or the countershaft 13), an output voltage and an output current of the storage device 22 and so on are sent to the HV-ECU 100. Torque commands to the first motor 4 and the second motor 16 calculated by the HV-ECU 100 are sent to an after-mentioned motor control unit (as will be called the "MG-ECU" hereinafter) 101 that is also an electronic control unit, and a torque command to the engine 1 calculated by the HV-ECU 100 is sent to an after-mentioned engine control unit (as will be called the "EG-ECU" hereinafter) 102 that is also an electronic control unit. Hydraulic pressures applied to the input clutch C0, the series clutch CS and the brake B0 are controlled by controlling supply current to not shown solenoid valves for controlling the oil delivered to those engagement devices based on hydraulic commands PbCS, PbC0, and PbB0 calculated by the HV-ECU 100.

The MG-ECU 101 and the EG-ECU 102 are also configured to carry out a calculation based on incident data, stored data and stored programs, and transmit a calculation result in the form of command signal. Specifically, the MG-ECU 101 is configured to calculate supply currents to the first motor 4 and the second motor 16 based on the torque commands transmitted from the HV-ECU 100, and to transmit current command signals to the power source 24. The EG-ECU 102 is configured to calculate a target torque of the engine 1, and to transmit command signals to an electronic throttle valve and a fuel injector to control an opening degree of the throttle valve and a fuel injection.

Engagement states of the clutches C0 and CS and the brake B0 in each operating mode are shown in FIG. 6. In FIG. 6, "O" represents an engagement of the engagement device. In the EV mode, the vehicle is propelled by an electric power of the storage device 22, and the EV mode can be selected from a single-motor mode in which the vehicle is powered only by the second motor 16, and a dual-motor mode in which the vehicle is powered by both of the first motor 4 and the second motor 16. Further, the single-motor mode can be selected from a disconnecting mode in which the first motor 4 is disconnected completely from the powertrain in order not to be rotated, and a connecting mode in which the first motor 4 is connected to the second motor 16 and driving wheels to be rotated passively. In the disconnecting mode, specifically, all of the clutches C0 and CS and the brake B0 are disengaged while activating the second motor 16 by the electric power from the storage device 22 so that an output torque of the second motor 16 is delivered to the differential unit 20 through the countershaft 13. In this situation, although the output gear 12 is rotated by a rotation of the driven gear 14, the carrier 7 is allowed to rotate freely and hence the engine 1 and the first motor 4 are prevented from being rotated. By contrast, in the connecting mode, only the input clutch C0 is engaged while activating the second motor 16 by the electric power from the storage device 22. In this situation, the carrier 7 is connected to the input shaft 8 to be prevented from being rotated so that the sun gear 5 is rotated in the opposite direction (i.e., in the counter direction) together with the rotor shaft 10 and the rotor 9 connected thereto. Such status of the power distribution device 3 in the connecting mode is indicated in a nomographic diagram shown in FIG. 7a. In FIGS. 7a, 7b, 7c and 7d, "ON" and "OFF" individually represents an engagement and a disengagement of the engagement element, and the arrow indicates a direction of the torque.

The dual-motor mode is established by engaging the input clutch C0 and the brake B0. In the dual-motor mode, both of the first motor 4 and the second motor 16 are activated by the electric power supplied from the storage device 22 to propel the vehicle. In this case, the carrier 7 of the power distribution device 3 is halted and hence ring gear 6 and the output gear 12 are rotated in the forward direction to propel the vehicle in the forward direction by rotating the first motor 4 in the counter direction. Consequently, an output torque of the first motor 4 is delivered from the output gear 12 to the differential gear unit 20 through the countershaft 13. In this situation, if the second motor 16 is rotated in the forward direction, an output torque thereof is added to the torque delivered from the output gear 12 at the countershaft 13 so that a total torque of the first motor 4 and the second motor 16 is delivered to the differential gear unit 20. Here, in the EV mode, an operating state of the power distribution device 3 will not be changed in a forward stage and in a reverse stage.

Figure 7A:
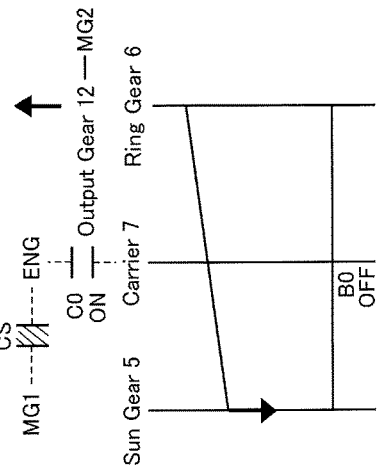
FIGS. 7a, 7b, 7c and 7d are nomographic diagrams showing status of the power distribution device in each operating mode.
Figure 7B:
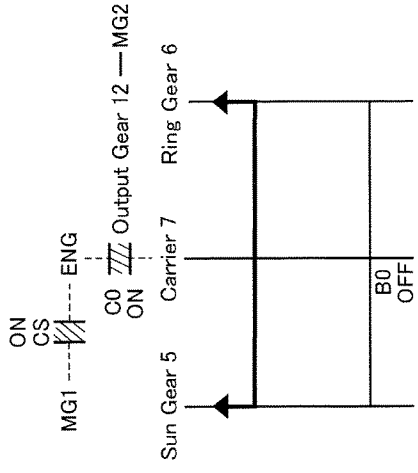

In the HV mode, the series mode is established by engaging only the series clutch CS. FIG. 7b shows an operating state of the power distribution device 3 under the situation in which the vehicle is propelled in the forward direction in the series mode. In the series mode, an output torque of the engine 1 is delivered to the first motor 4 through the series clutch CS so that the first motor 4 is operated as a generator. In this case, the carrier 7 of the power distribution device 3 is allowed to rotate freely and hence an output torque of the engine 1 is not delivered to the output gear 12. An electric power generated by the first motor 4 is supplied to the second motor 16 to operate the second motor 16 as a motor, and an output torque of the second motor 16 is delivered to the differential gear unit 20 through the countershaft 13 to propel the vehicle. In this situation, as indicated in FIG. 7b, the ring gear 6 is rotated in the forward direction in accordance with the vehicle speed, and the sun gear 5 is rotated at a same speed as the engine 1. Consequently, the carrier 7 is idled at a speed governed by rotational speeds of the ring gear 6 and the sun gear 5 and a gear ratio of the power distribution device 3 (i.e., a ratio between teeth number of the sun gear 5 and teeth number of the ring gear 6). In the series mode, a travelling direction of the vehicle can be switched between the forward direction and the backward direction by switching a rotational direction of the second motor 16.

In the series parallel mode, the vehicle is powered by the engine 1, the first motor 4 and the second motor 16. If the vehicle is propelled in the forward direction, the series parallel mode may be switched between a variable mode in which a ratio of an engine speed to an output shaft speed (e.g., speed of the output gear 12) can be varied continuously, and a fixed mode in which the power distribution device 3 is rotated integrally.

Figure 7C:
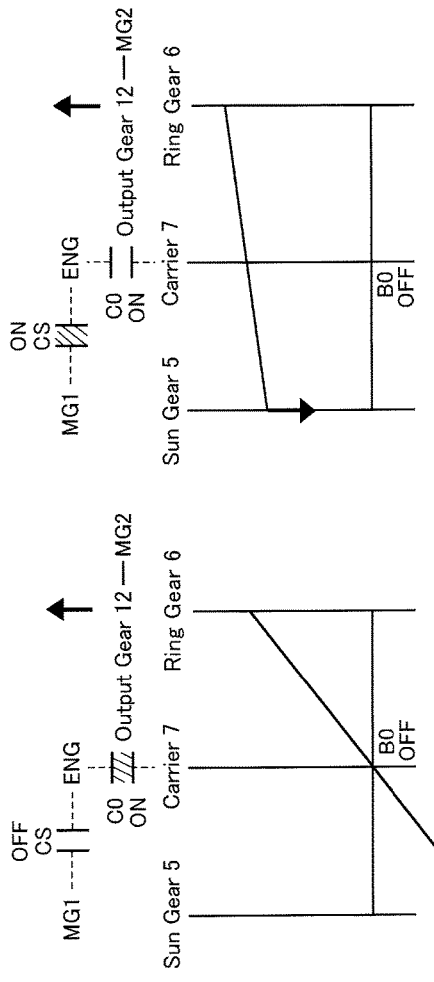

Specifically, during forward propulsion in the series parallel mode, the variable mode is established by engaging only the input clutch C0. FIG. 7c shows an operating state of the power distribution device 3 in the variable mode. In this case, an output torque of the engine 1 is delivered to the carrier 7 of the power distribution device 3 through the input clutch C0 so that the carrier 7 is rotated in the forward direction. In this situation, the first motor 4 is operated as a generator and hence a negative torque is applied to the sun gear 5. Consequently, the ring gear 6 and the output gear 12 integral therewith are rotated in the forward direction. An electric power generated by the first motor 4 is supplied to the second motor 16 to operate the second motor 16 as a motor, and an output torque of the second motor 16 is added to the torque delivered from the output gear 12 at the countershaft 13. Thus, in the variable mode, power of the engine 1 is partially delivered from the output gear 12 to the differential gear unit 20 through the power distribution device 3, and the remaining power of the engine 1 is once converted into an electric power to activate the second motor 16 and then converted into a drive torque by the second motor 16 to be delivered to the differential gear unit 20. In the variable mode, a speed of the engine 1 can be controlled in an optimally fuel efficient manner by controlling a speed of the first motor 4.

Figure 7D:
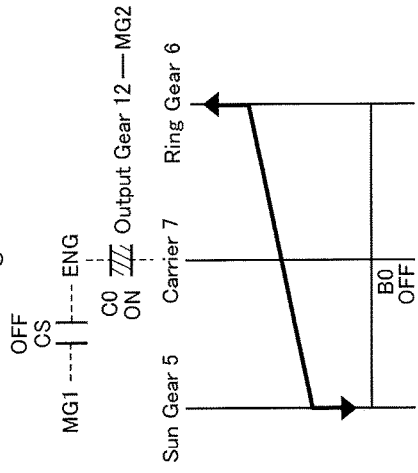

During forward propulsion in the series parallel mode, the fixed mode is established by engaging the input clutch C0 and the series clutch CS. FIG. 7d shows an operating state of the power distribution device 3 in the fixed mode. In this case, since the input clutch C0 and the series clutch CS are engaged, the carrier 7 is connected to the sun gear 5 so that the power distribution device 3 is rotated integrally. Consequently, an output torque of the engine 1 is delivered to the output gear 12 without being amplified or reduced. In this situation, the first motor 4 is connected to the engine 1 through the power distribution device 3, and hence an output torque of the first motor 4 driven as a motor by the electric power supplied from the storage device 22 can be added to the output torque of the engine 1. Likewise, an output torque of the second motor 16 driven as a motor by the electric power supplied from the storage device 22 may also be added to the output torque of the engine 1.

In case of propelling the vehicle in the backward direction, only the input clutch C0 is engaged. In this case, the first motor 4 is rotated in the forward direction by the power of the engine 1 to serve as a generator, and the second motor 16 is rotated in the backward direction to serve as a motor thereby propelling the vehicle in the backward direction.

Figure 8:
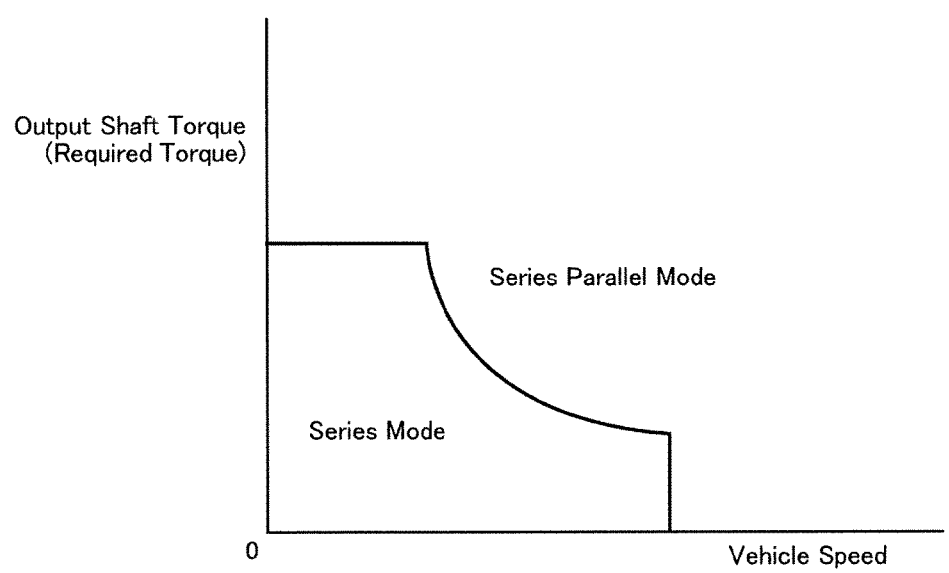
FIG. 8 is a map defining a boundary between the series mode and the series parallel mode based on an output shaft torque and a vehicle speed.

In the EV mode and the series mode, a maximum drive torque is governed by specifications of the first motor 4 and the second motor 16. For example, in the series mode, the maximum drive torque is limited to the maximum torque of the second motor 16, and as shown in FIG. 8, the maximum drive torque is reduced in accordance with an increase in the vehicle speed after the vehicle speed is increased to a certain level. According to the preferred example, therefore, the HV mode is shifted between the series mode and the series parallel mode with reference to the map shown in FIG. 8 defining operating regions of those modes based on the vehicle speed and the output shaft torque (or a required torque).

Here will be explained another embodiment of the drive unit according to the present application with reference to FIGS. 9 to 11. In order to selectively transmit a torque from the engine 1 to the output gear 12 through the power distribution device 3, the input clutch C0 may also be disposed between the ring gear 6 and the output gear 12. Likewise, in order to selectively transmit a torque from the engine 1 to the first motor 4, the series clutch CS may also be disposed between the carrier 7b and the rotor shaft 10. The remaining structures are similar to those of the drive unit shown in FIG. 1, and detailed explanations for the common elements will be omitted by allotting common reference numerals thereto. Although the intermediate shaft 11 is not arranged in the drive unit shown in FIG. 9, the intermediate shaft 11 may optionally be arranged in the drive unit shown in FIG. 9. In this case, the brake B0 may also be arranged between the intermediate shaft 11 and the rear housing 32.

Figure 9:
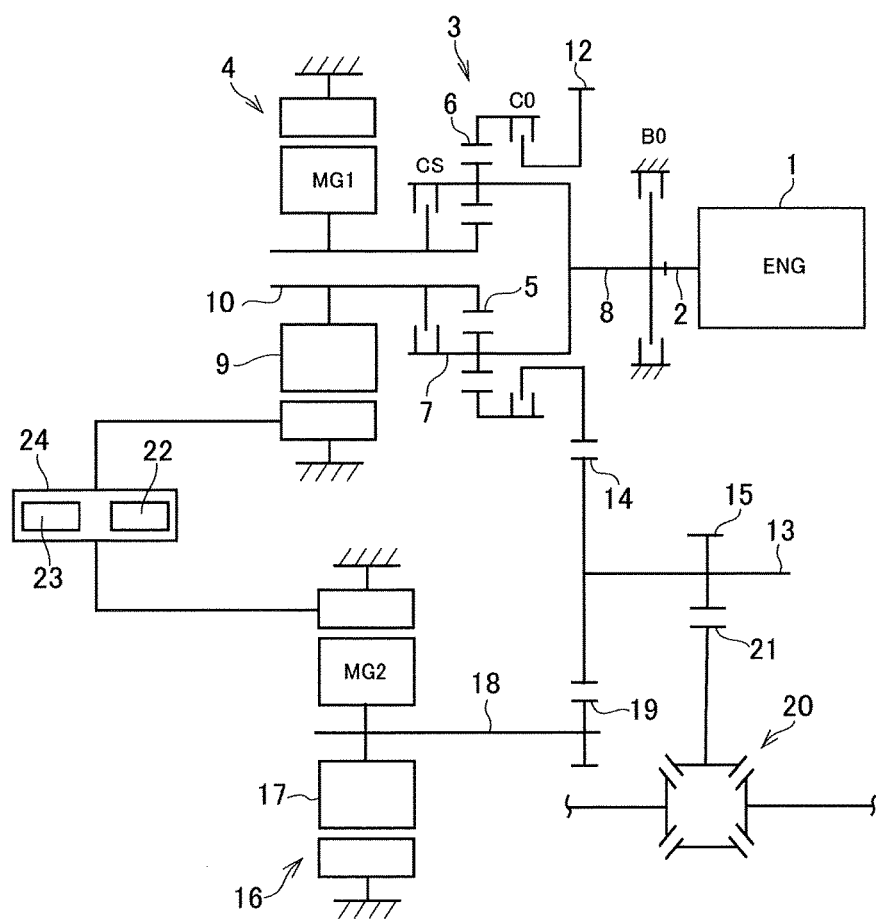
FIG. 9 is a schematic diagram showing another embodiment of the drive unit according to the present application.
Figure 10:
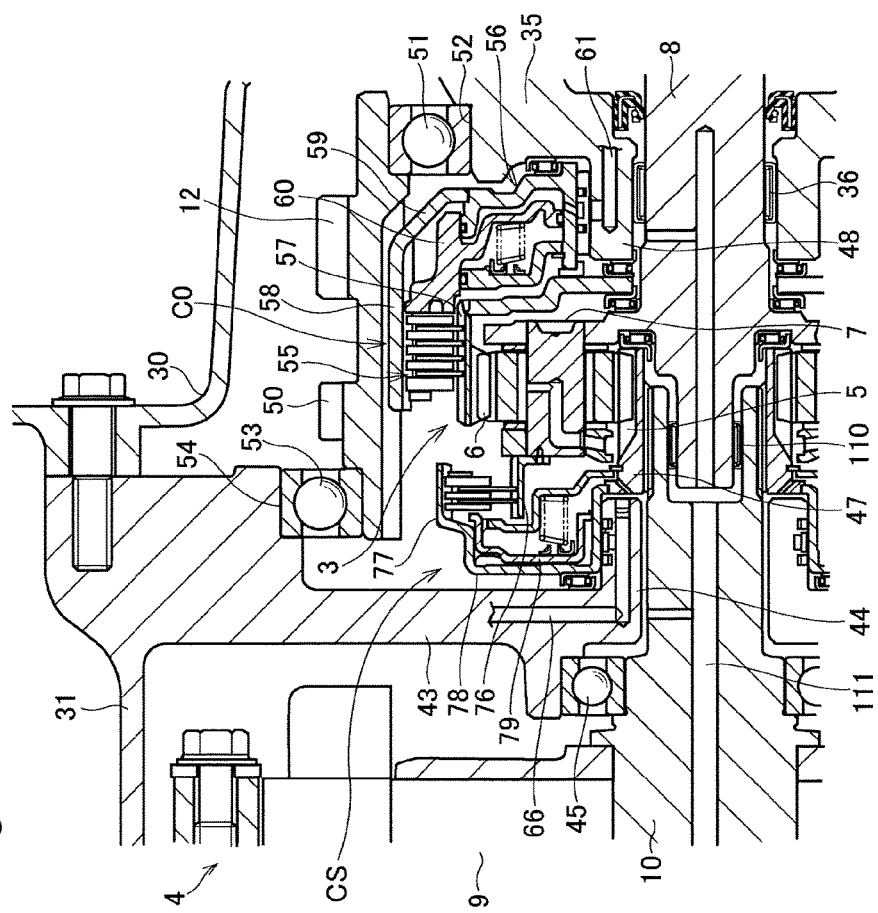
FIG. 10 is a partial cross-sectional view showing a cross-section of the power distribution device shown in FIG. 9 and in the vicinity thereof.

FIG. 10 shows a cross-section of the drive unit shown in FIG. 9 around the power distribution device 3. In FIG. 10, common reference numerals are allotted to the elements in common with those shown in FIGS. 2 and 3.

As depicted in FIG. 10, in the example shown in FIG. 9, the output gear 12 is also supported by the first bulkhead 35 and the second bulkhead 43 through the second bearing 51 and the third bearing 53, and the input clutch C0 and the power distribution device 3 are disposed in the inner circumferential side of the output gear 12. In the example shown in FIG. 9, the series clutch CS is also disposed in the inner circumferential side of the output gear 12. The carrier 7 of the power distribution device 3 is shaped into a flange member to be connected to the input shaft 8. An outer circumferential face of the ring gear 6 serves as the clutch hub 57 to which the clutch discs are splined. A cylindrical portion of the clutch drum 58 extends in an outer circumferential side of the ring gear 6, and the clutch plates are splined to an inner circumferential face of the cylindrical portion of the clutch drum 58. Spline teeth are individually formed on an outer circumferential face of the clutch drum 58 and an inner circumferential face of the output gear 12 so that the clutch drum 58 is splined to the output gear 12 through the spline teeth. That is, the friction facings 55 of the input clutch C0 are situated in an outer circumferential side of the power distribution device 3. The cylinder 59 of the actuation member 56 is fitted onto the boss 48 of the front housing 30 in a rotatable manner. Thus, in the drive unit according to another embodiment, the input clutch C0 is disposed on the torque transmitting route between the input shaft 8 and the output gear 12 to selectively allow a torque transmission therebetween.

The series clutch CS is disposed coaxially between the power distribution device 3 and the second bulkhead 43 of the mid-housing 31, and comprises the cylinder 78 and the clutch drum 77 connected thereto. The cylinder 78 is fitted onto the boss 44 of the second bulkhead 43 in a rotatable manner to be connected to the sun gear shaft 47, and the clutch hub 76 is attached to the carrier 7. The clutch discs are splined onto the clutch hub 76, and the clutch plates are splined to an inner circumferential face of the clutch drum 77. The piston 79 is held in the cylinder 78 while being allowed to hydraulically reciprocate in the axial direction to engage the clutch plates with the clutch discs. To this end, the oil is delivered to the series clutch CS through the oil passage 66 formed in the second bulkhead 43. Since the sun gear shaft 47 is connected to the rotor shaft 10, the carrier 7 can be selectively connected to the first motor 4 through the series clutch CS.

As described, the intermediate shaft 11 is not arranged in the drive unit according to another embodiment, and hence the leading end of the input shaft 8 is inserted into the leading end of the rotor shaft 10 through a bearing 110 interposed therebetween. In addition, a lubrication passage 111 penetrates through the rotor shaft 10 along a rotational center axis. The remaining structures are similar to those shown in FIG. 3, and detailed explanations for the common elements will be omitted by allotting common reference numerals thereto.

In the drive unit according to another embodiment, the operating mode can be selected from the above-explained EV mode and HV mode by manipulating the input clutch C0, the series clutch CS and the brake B0. Specifically, in the EV mode in which the vehicle is powered by the second motor 16, all of the input clutch C0, the series clutch CS and the brake B0 are disengaged. Consequently, the output gear 12 is disconnected from the ring gear 6 of the power distribution device 3 so that the sun gear 5, the ring gear 6 and the carrier 7 are prevented from being rotated. In this situation, if the input clutch C0 is engaged, the ring gear 6 is rotated together with the output gear 12, and since the ring gear 7 is halted together with the engine 1, the sun gear 5 and the first motor 4 connected thereto are rotated in the counter direction. As a result, the operating mode is shifted from the disconnecting mode to the connecting mode. A status of the power distribution device 3 in the connecting mode is indicated in a nomographic diagram shown in FIG. 11a. In this situation, the carrier 7 is allowed to establish a reaction torque against an output torque of the first motor 4 by engaging the brake B0 to halt the input shaft 8 and the carrier 7. Consequently, the operating mode is shifted to the dual-motor mode in which the vehicle is powered by the first motor 4 rotated in the counter direction and the second motor 16 rotated in the forward direction.

Figure 11A:
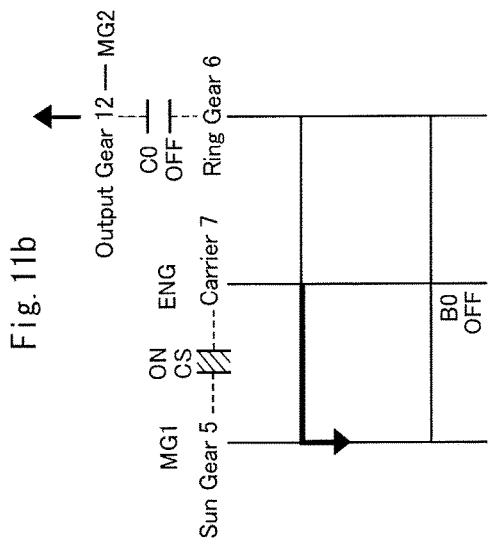
FIGS. 11a, 11b, 11c and 11d are nomographic diagrams showing status of the power distribution device shown in FIGS. 9 and 10 in each operating mode.
Figure 11B:
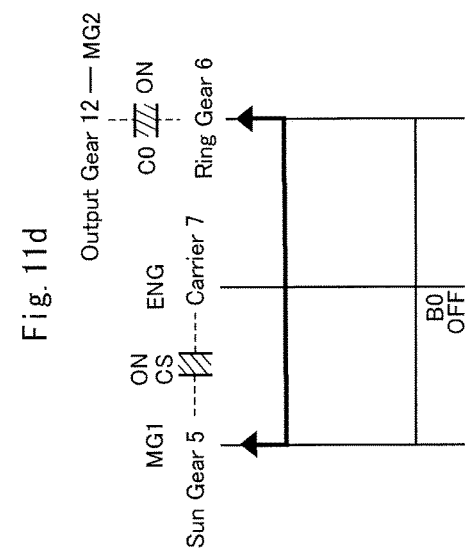
Figure 11C:
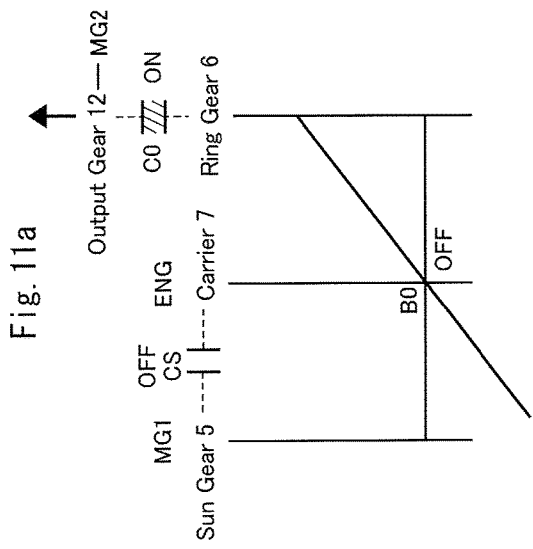

As described, in the series mode, the first motor is operated as a generator by rotating the first motor 4 by the engine 1 while engaging the series clutch CS, and the second motor is operated as a motor by the electric power generated by the first motor 4 to propel the vehicle. In the drive unit according to another embodiment, the sun gear 5 is connected to the carrier 7 by the series clutch CS so that the power distribution device 3 is rotated integrally, and consequently the first motor 4 is rotated by the engine 1 to generate an electric power. In this situation, however, the input clutch C0 is in disengagement to disconnect the ring gear 6 from the output gear 12 and hence the output torque of the engine 1 will not be applied to the output gear 12. An operating state of the power distribution device 3 in the series mode is shown in FIG. 11b, and as shown in FIG. 11b, the sun gear 5, the ring gear 6 and the carrier 7 are rotated at a same speed.

As the embodiment shown in FIGS. 1 to 4, during forward propulsion in the variable mode, a speed of the engine 1 is controlled in an optimally fuel efficient manner by controlling a speed of the first motor 4, and the second motor 16 is operated as a motor by the electric power generated by the first motor 4. An operating state of the power distribution device 3 in the variable mode is shown FIG. 11c. In another embodiment, although positions of the input clutch C0 and the series clutch CS are different from those in the embodiment shown in FIG. 1 to 4, rotational directions of the sun gear 5, the ring gear 6 and the carrier 7 are same as those shown in FIG. 7c.

Figure 11D:
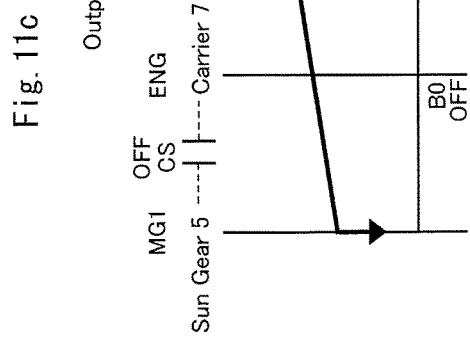

In the HV mode, the fixed mode is established by engaging the input clutch C0 and the series clutch CS so that the power distribution device 3 is rotated integrally. In this situation, the vehicle can be powered by all of the engine 1, the first motor 4, and the second motor 16. An operating state of the power distribution device 3 in the fixed mode is shown in FIG. 11d, and as shown in FIG. 11d, the rotational directions of the sun gear 5, the ring gear 6 and the carrier 7 are also same as those shown in FIG. 7d.

Thus, according to another embodiment, an operating mode of the drive unit may also be selected from a plurality of modes. In addition, the input clutch C0 is entirely held in the inner circumferential side of the output gear 12 and the series clutch CS is partially held in the inner circumferential side of the output gear 12. According to another embodiment, therefore, the number of components arranged in the axial direction of the output gear 12 may also be reduced to shorten an axial length of the drive unit.

Although the above exemplary embodiments of the present application have been described, it will be understood by those skilled in the art that the present application should not be limited to the described exemplary embodiments, and various changes and modifications can be made within the spirit and scope of the present application. For example, a dog clutch and a one-way clutch may also be used as the clutches C0 and CS and the brake B0 instead of the friction clutch.

What is claimed is:

1. A drive unit for a hybrid vehicle, comprising:
    an engine;
    a first motor having a generating function;
    a power distribution device that performs a differential action among an input element to which a torque of the engine is applied, a reaction element to which a torque of the first motor is applied, and an output element;
    an output gear to which a torque is delivered from the output element;
    a first clutch that connects an output shaft of the engine to a rotor of the first motor;
    a second clutch that allows a torque transmission from the engine to the output gear through the power distribution device;
    a second motor that is activated by an electric power generated by the first motor to generate a drive torque to propel the vehicle; and
    a housing holding the first motor, the power distribution device, the output gear, the first clutch, and the second clutch, the housing including a first bulkhead formed integrally within the housing,
    wherein the power distribution device, the output gear, the first motor, the first clutch, and the second clutch are arranged coaxially,
    wherein the output gear is shaped into a cylinder,
    wherein a first bearing is fitted onto the first bulkhead to rotatably support a first axial end of the output gear,
    wherein the power distribution device is disposed in an inner circumferential side of the output gear,
    wherein the second clutch includes an actuation member that is actuated by a hydraulic pressure, and friction facings that are engaged to frictionally transmit torque therebetween by the actuation member, the second clutch being disposed in the inner circumferential side of the output gear,
    wherein the actuation member is fitted onto the first bulkhead while being adjacent to the power distribution device in an axial direction, and
    wherein an oil passage for delivering oil to the actuation member or discharging oil therefrom is formed in the first bulkhead.

2. The drive unit for the hybrid vehicle as claimed in claim 1,
    wherein the second clutch is adapted to selectively deliver output torque of the engine to the input element, and
    wherein the output element is connected to the output gear.

3. The drive unit for the hybrid vehicle as claimed in claim 1,
    wherein the second clutch is adapted to selectively connect the output element to the output gear, and
    wherein the input element is connected to the engine.

4. The drive unit for the hybrid vehicle as claimed in claim 3, wherein the first clutch is disposed on an opposite side of the second clutch across the power distribution device in the axial direction and in the inner circumferential side of the output gear.

5. The drive unit for the hybrid vehicle as claimed in claim 1, further comprising:
    an input shaft to which an output torque of the engine is applied, and which is inserted into the power distribution device along a rotational center axis,
    wherein the input shaft penetrates through the first bulkhead while being rotatably supported by a second bearing.

6. The drive unit for the hybrid vehicle as claimed in claim 5,
    wherein the first bulkhead includes a cylindrical boss protruding in parallel to the input shaft toward the power distribution device,
    wherein the second bearing is interposed between the input shaft and the boss, and
    wherein the actuation member is fitted onto the boss.

7. The drive unit for the hybrid vehicle as claimed in claim 5,
    wherein the housing includes a second bulkhead that is disposed on an opposite side of the first bulkhead across the power distribution device in the axial direction, and
    wherein a second axial end of the output gear is rotatably supported by a third bearing interposed between the second axial end of the output gear and the second bulkhead.

* * * * *